United States Patent Office 2,960,437
Patented Nov. 15, 1960

2,960,437

ION EXCHANGE PURIFICATION OF BASIC ANTIBIOTICS

Ira J. Friedman, Hicksville, Edward G. Martin, Whitestone, and Roy J. Taylor, Flushing, N.Y., assignors to Chas. Pfizer & Co., Inc., Brooklyn, N.Y., a corporation of Delaware No Drawing. Filed Feb. 23, 1955, Ser. No. 490,148

5 Claims. (Cl. 167—65)

This invention is concerned with a novel method for the recovery of basic antibiotics. In particular, it is concerned with a method which utilizes two different types of ion-exchange resins in sequence.

Various basic antibiotics including streptomycin, viomycin, and others of this type have been recovered by contacting impure aqueous solutions of the active agents with an ion-exchange resin having acidic groups, in particular, carboxyl groups. The antibiotic, which is selectively removed from the impure aqueous solution by means of the resin, is then eluted in purified form from the latter. However, processes utilized in the past have generally had certain deficiencies. The degree of purification obtained by contacting the antibiotic solution with the resins was limited and very often other types of purification steps were essential in order to obtain a product of sufficient purity for utilization in pharmaceuticals.

In copending patent application Serial No. 454,202, filed on September 3, 1954, now Patent No. 2,827,417, by Ira J. Friedman et al. (of which the present application is a continuation-in-part), it was disclosed that contacting an impure aqueous solution of a basic antibiotic with two specific distinct types of carboxylic acid cationexchange resins, eluting the adsorbed antibiotic with acid after adsorption, results in an unusual degree of purification of the antibiotic. It was also disclosed that the use of a sulfonic acid type ion-exchange resin in the acid state in addition to the two carboxylic acid resins results in still greater purification of the antibiotics.

Although it was originally felt necessary to include both carboxylic acid purification steps, it has now been found that even though one of the carboxylic acid purification steps is omitted, there is achieved, nevertheless, a remarkable degree of purification of the crude antibiotics. Contacting an impure aqueous solution of a basic antibiotic with a resin having, as its principal active exchanging groups, carboxyl radicals, eluting the antibiotic from the resin with acid and contacting the solution of the antibiotic with a sulfonic acid-type of ion-exchange resin in the acid form results in a remarkable degree of purification of the antibiotic.

The eluate obtained by removal of the antibiotic from the first type of resin, that is, the carboxylic acid-type of resin, by means of dilute solution of a mineral acid is particularly well suited for further purification by contact with an ion-exchange resin having for its principal exchanging groups the sulfonic acid radical. The first step in the process is effective in separating the antibiotic from certain of the impurities present in the impure aqueous solutions used as starting material, particularly organic impurities which are commonly present to a very great extent in filtered fermentation broths containing basic antibiotics. However, there remain in the crude antibiotic eluted from the first type of resin appreciable amounts of various impurities, particularly inorganic materials, but also certain organic substances. The acid eluate from the carboxylic acid-type ion-exchange resin may most effectively be purified by further contact in the acid state with the sulfonic acid-type resin.

In the present process, the carboxylic acid ion-exchange resin which is first utilized is preferably one which is a copolymer of methacrylic acid and from about 6 to about 12 percent by weight of a divinyl aromatic compound, such as divinylbenzene, divinyltoluene, or divinylnaphthalene, as a cross-linking material. The resin is preferably prepared in beadlet form by polymerization in aqueous suspension of globules of methacrylic acid or an ester thereof. If an ester is used as starting material, the ester group must, of course, be hydrolyzed before the carboxylic acid groups become available for the ion-exchange function. Such resins are marketed commercially under the trade-name "Amberlite IRC-50" and are described in detail in U.S. Patent 2,340,111. If the acid is used, a water-soluble inorganic salt may be used to reduce its solubility in water.

The resin is utilized in the first step of the present process in at least partially neutralized form, and is preferably adjusted to an equilibrium pH from neutral to slightly basic, that is, from about 7 to about 8. Adjustment is made by means of a water-soluble alkali, for instance, sodium hydroxide or potassium hydroxide, before contacting the antibiotic solution with the resin. The antibiotic adsorbed on the resin is then eluted by means of a dilute acid, preferably a mineral acid, such as dilute hydrochloric acid or dilute sulfuric acid. This process step and the subsequent steps in the process may be operated in a so-called "two-tower process" such as described in U.S. Patent 2,528,188.

The ion-exchange resin which is used for the second stage of the process is a sulfonic acid-type resin of low porosity containing a high proportion of a cross-linking component. Resins which are copolymers of sulfonated polystyrenes and divinyl aromatic compounds, such as divinyltoluene, divinyl benzene, divinylxylene, and so forth, are particularly useful. Resins of this nature are available commercially under the trade-name "Dowex-50." These contain varying proportions of divinylbenzene as the cross-linking component. A proportion of approximately 16% of divinylbenzene is quite useful. Somewhat higher or lower proportions, that is, between about 10 and 25% may be used for this purpose. This type of resin is described in U.S. Patent 2,366,007. The resin for this stage of the process is utilized in its acid form; that is, at a pH of 2.5 or lower. The eluate from the first stage of the present process, which is an acid solution, is used directly in the second stage without adjustment of the pH. As is the case with the first stage of the process, the second purification step is preferably operated with the resin in a tower-type of device so that the acid eluate from the first tower may be passed directly into the second tower.

The antibiotic in the acid solution coming in contact with the acid form of the sulfonic acid-type resin is not adsorbed thereon to any appreciable extent. However, a variety of impurities, particularly inorganic substances, but also organic materials, are selectively removed from the acid solution by the sulfonic acid-type resin resulting in a highly purified solution of the basic antibiotic. In many cases, the purity of the solution is so high that the antibiotic may be crystallized directly from the solution by concentrating it carefully, e.g. under vacuum at a low temperature or by concentrating and adding a suitable water-miscible, non-solvent for the antibiotic salt. In some cases, it is necessary to adjust the pH of the solution before concentrating, since there may be a tendency to decompose some of the product, if concentration is effected under highly acid conditions. In operating the present process as noted above, sulfuric acid may be utilized for the elution of the adsorbed antibiotic from the first type of resin used, that is, the carboxylic acid-type resin. Alternatively, other acids, such as hydrochloric acid, hydrobromic acid, etc., may be used. Excess acid may be separated from the solution obtained after contact with the second ion-exchange resin by the formation of a slightly soluble substance. For instance, if sulfuric acid has been used, barium hydroxide or carbonate may be added to a suitable pH and the precipitated barium sulfate may then be separated from the solution before concentrating it and isolating the purified or crystalline antibiotic salt. If hydrochloric acid is used for eluting the first resin, then the excess acid may be separated by the addition of an agent, such as silver carbonate. Alternatively, certain anion-exchange resins may be utilized for the adjustment of the pH of the aqueous solution by removal of excess acid. After the resin has been separated from the aqueous solution, the antibiotic solution may be concentrated to recover the purified or crystalline antibiotic. In general, the acid salts of the basic antibiotics have a pH in aqueous solution ranging from about 4.0 to about 6.5.

During the operation of the present process, it is desirable to maintain the solutions of the antibiotics at low pH's, that is, pH's below about 2.5, for a minimum time. Thus, after elution of the antibiotic from the first resin step, contact with the second resin should be made with reasonable rapidity and the effluent from the second resin should then be adjusted to a suitable pH, that is, to at least about 4.5, without undue loss of time. As noted above, the antibiotic solutions obtained by the present process have an unusual degree of purity and, in many cases, it is possible to utilize the adjusted effluent from the second resin directly without further treatment, such as crystallization. Solutions of this nature may be utilized, for instance, in veterinary medicine. It may be desirable to concentrate such solutions and add stabilizing agents before the product is put to such use. Often sterilization may be effected by filtering the solution through suitable apparatus. It should be noted that the products of the present invention are remarkably free of pyrogens and possess little or no histaminic materials which often cause difficulty with antibiotics purified by other processes until very definite detailed steps are taken to remove these materials.

It has been found that the treatment of impure aqueous solutions of basic antibiotics by carboxylic acid resins of the type described above (that is, the Amberlite IRC–50 type resin) may be repeated to obtain a purified solution of the antibiotic having an even higher purity and lending itself most readily to further purification by contact with the sulfonic acid-type resins described above. Further treatment with carboxylic acid resin or sulfonic acid-type resin does not tend to increase the purity of the antibiotic to any appreciable extent, and, as noted above, the product from the sulfonic acid-type resin treatment may often be crystallized without further specific purification steps. The use of the Amberlite XE–89 type resin followed by the use of the sulfonic acid type resin does not impart as great a degree of purification. (Details of the preparation of the XE–89 type resin are given in the copending application Serial No. 288,951, filed May 20, 1952 by Edwin N. Lightfoot, Jr.)

Among the antibiotics which may be purified by the present process are streptomycin, viomycin, dihydrostreptomycin, hydroxystreptomycin, streptothricin, mannosidostreptomycin, neomycin and others of this nature. These all contain highly basic groups, such as guanidino groups, and they may be purified with unexpected ease by the process of the present invention.

The following examples are given by way of illustration, and are not to be regarded as limitations of this invention, many variations of which are possible without departing from its spirit or scope.

*Example I*

Streptomycin fermentation broth having a potency of about 750 units per milliliter was filtered after adjustment of the pH to about 2.5. The filtered solution was passed over a column of Amberlite IRC–50 resin at a pH of about 7.5, that is, the fermentation broth was adjusted to 7.5 with sodium hydroxide and the resin was equilibrated at this pH by contact with a dilute solution of sodium hydroxide. After adsorption of the antibiotic on the resin the column of the resin was washed with a small volume of water and the wash discarded. The antibiotic was then eluted utilizing a solution of 0.35 N-hydrochloric acid. After all the antibiotic had passed out of the column of resin, the eluate was neutralized with sodium hydroxide solution. The eluate contained about 7 milligrams of antibiotic per milliliter of solution. This solution was passed into a second column containing Amberlite IRC–50 equilibrated at pH 7.5. When the resin no longer adsorbed additional streptomycin, the feed was discontinued and the resin was eluted with 0.35 N-sulfuric acid. Excess sulfuric acid was removed from the acid solution with barium hydroxide. The impure solution contained about 6% by weight of impurities based on the total weight of the crude product in solution. This solution was passed over a column containing Dowex 50–X16 type resin in the acid form. The effluent was neutralized with barium hydroxide and the resulting barium sulfate was filtered. After concentrating the aqueous solution carefully under vacuum, it was treated with a small amount of decolorizing carbon, filtered and poured into methanol. The precipitated streptomycin sulfate was filtered and dried. The dried product assayed 745 micrograms of streptomycin per milligram. It contained 0.6% ash.

*Example II*

Filtered neomycin fermentation broth containing 500 micrograms of neomycin per milliliter was adjusted to pH 7.5 and the broth was fed to a column containing 33 liters of Amberlite IRC–50 resin which had previously been equilibrated at pH 7.5 with sodium hydroxide solution. The feed was continued until the resin no longer adsorbed neomycin. The columns were washed with water to remove residual broth and the antibiotic was then eluted with 1% sulfuric acid solution. The first of the eluate containing little antibiotic was separated. The following solution which contained a high proportion of the antibiotic was collected. This had a volume of 45 gallons and a pH of 2.1. The solution contained 12.5 milligrams of neomycin per milliliter, 33 milligrams of total solid per milliliter, and 5 milligrams of ash per milliliter (in the form of sulfated ash). The partially purified solution was then fed to a column containing 35 liters of Dowex 50–X16 resin in the acid form. The effluent from the column containing the antibiotic was neutralized with barium hydroxide solution and the barium sulfate was filtered. The purified solution was treated with a small amount of decolorizing carbon and then filtered. This solution contained only 0.04 milligram of ash per milliliter (as sulfated ash). A solid product was isolated by concentrating the solution at a low temperature under vacuum and adding the concentrated solution to methanol. The precipitated solid was filtered, washed with a small volume of methanol and dried. The neomycin sulfate thus obtained assayed 670 micrograms per milligram and contained only 0.55% of ash.

*Example III*

Filtered viomycin fermentation broth was adjusted to pH 7.5. This solution contained approximately 300 micrograms of viomycin per milliliter. It was fed to a column containing Amberlite IRC–50 resin which had previously been equilibrated at pH 7.5 with sodium hydroxide solution. The solution was fed to the column until an appreciable amount of antibiotic began to appear in the effluent from the column. The column of resin with adsorbed antibiotic was washed with a small volume of water and the antibiotic was then eluted with 0.35 N-sulfuric acid solution. Excess acid in the eluate was neutralized with barium hydroxide. 15.6 liters of this solution was passed over a column containing 1350 milliliters of Dowex 50–X16 resin. The acid effluent from the column was neutralized with barium hydroxide and the barium sulfate was filtered. The aqueous solution was then carefully concentrated under vacuum and the concentrated aqueous solution was decolorized, with activated carbon. Viomycin sulfate was crystallized from the solution by the addition of 2½ volumes of methanol. 147 grams of crystalline viomycin sulfate assaying 790 micrograms per milligram was obtained. This material contained 0.2% ash and 4% volatile material. When corrected for these impurities, the material has a potency of 824 micrograms per milligram which is very close to the theoretical potency of pure viomycin sulfate.

What is claimed is:

1. A process for the purification of a basic antibiotic, which comprises contacting an impure aqueous solution of said antibiotic with a carboxylic acid-type ion-exchange resin of limited porosity which is a copolymer of methacrylic acid and from about 6 to about 12 percent by weight of a divinyl hydrocarbon aromatic compound and which is at an equilibrium pH of about 7 to 8, eluting the adsorbed antibiotic from said resin with dilute aqueous acid, soon thereafter contacting the solution of eluted antibiotic thereby obtained with a low porosity sulfonic acid-type ion-exchange resin which is in its acid form and is a copolymer of a sulfonated polystyrene and from about 10 to about 25 percent by weight of a divinyl hydrocarbon aromatic compound, and adjusting the effluent to a pH of at least about 4.5.

2. A process as claimed in claim 1 wherein the impure aqueous basic antibiotic solution is a filtered fermentation broth.

3. A process for the purification of streptomycin, which comprises contacting filtered streptomycin fermentation broth with an ion-exchange resin of limited porosity which is at an equilibrium pH of about 7 to 8 and which comprises methacrylic acid copolymerized with from about 6 to about 12 percent of divinylbenzene, eluting the antibiotic with a dilute aqueous mineral acid, soon thereafter contacting the acid solution thereby obtained with a polystyrene sulfonic acid copolymerized with from about 10 to about 20 percent of divinylbenzene and in its acid form, adjusting the effluent to a pH of at least about 4.5, and recovering the basic antibiotic from the purified aqueous solution thereby produced.

4. A process as claimed in claim 3 wherein filtered neomycin fermentation broth is utilized as the basic antibiotic.

5. A process as claimed in claim 3 wherein filtered viomycin fermentation broth is utilized as the basic antibiotic.

References Cited in the file of this patent

UNITED STATES PATENTS

| | | |
|---|---|---|
| 2,541,420 | Howe | Feb. 13, 1951 |
| 2,653,151 | Sokol et al. | Sept. 22, 1953 |
| 2,765,302 | Bartels et al. | Oct. 2, 1956 |
| 2,827,417 | Friedman et al. | Mar. 18, 1958 |

FOREIGN PATENTS

| | | |
|---|---|---|
| 670,438 | Great Britain | Apr. 16, 1952 |

OTHER REFERENCES

Baron: Handbook of Antibiotics, p. 4, pub. 1950, Reinhold Pub. Corp., N.Y.

Bohonos et al.: Archives of Biochemistry, November 1947, pp. 215–218.